(12) United States Patent
Wang et al.

(10) Patent No.: US 12,132,208 B2
(45) Date of Patent: Oct. 29, 2024

(54) POROUS METAL-ION AFFINITY MATERIAL

(71) Applicant: THE PENN STATE RESEARCH FOUNDATION, University Park, PA (US)

(72) Inventors: Donghai Wang, University Park, PA (US); Guoxing Li, University Park, PA (US)

(73) Assignee: The Penn State Research Foundation, University Park (PA)

( * ) Notice: Subject to any disclaimer, the term of this patent is extended or adjusted under 35 U.S.C. 154(b) by 1040 days.

(21) Appl. No.: 17/044,683

(22) PCT Filed: Apr. 12, 2019

(86) PCT No.: PCT/US2019/027165
§ 371 (c)(1),
(2) Date: Oct. 1, 2020

(87) PCT Pub. No.: WO2019/200219
PCT Pub. Date: Oct. 17, 2019

(65) Prior Publication Data
US 2021/0167395 A1 Jun. 3, 2021

Related U.S. Application Data

(60) Provisional application No. 62/656,443, filed on Apr. 12, 2018.

(51) Int. Cl.
*H01M 4/62* (2006.01)
*H01M 4/02* (2006.01)
(Continued)

(52) U.S. Cl.
CPC .......... *H01M 4/628* (2013.01); *H01M 4/366* (2013.01); *H01M 4/382* (2013.01);
(Continued)

(58) Field of Classification Search
CPC .. H01M 4/628; H01M 4/382; H01M 10/0569; H01M 10/0568; H01M 10/052; H01M 4/366
See application file for complete search history.

(56) References Cited

U.S. PATENT DOCUMENTS

2009/0208804 A1  8/2009  Kuroda et al.
2014/0239239 A1  8/2014  Cha et al.
(Continued)

OTHER PUBLICATIONS

International Preliminary Report on Patentability in connection to PCT/US2019/027165, dated Oct. 22, 2020.
(Continued)

*Primary Examiner* — Sarah A. Slifka
(74) *Attorney, Agent, or Firm* — Meunier Carlin & Curfman LLC (57) ABSTRACT

A battery includes an electrolyte, a metal anode and a cathode. The metal anode includes a porous material disposed thereon to protect the metal anode. The porous material has a zeta potential with a magnitude of at least above 15 mV in the electrolyte. The porous material can include a cross-linked polymer having segments with polar functional groups. Examples of polar functional groups include, but are not limited to, those comprising one or more among O, N, P, S, and B.

20 Claims, 9 Drawing Sheets

(51) Int. Cl.
    *H01M 4/36*     (2006.01)
    *H01M 4/38*     (2006.01)
    *H01M 10/052*     (2010.01)
    *H01M 10/0568*     (2010.01)
    *H01M 10/0569*     (2010.01)

(52) U.S. Cl.
    CPC ..... *H01M 10/052* (2013.01); *H01M 10/0568* (2013.01); *H01M 10/0569* (2013.01); *H01M 2004/021* (2013.01); *H01M 2004/027* (2013.01); *H01M 2300/0025* (2013.01)

(56) References Cited

U.S. PATENT DOCUMENTS

| | | |
|---|---|---|
| 2015/0236324 A1 | 8/2015 | Xiao et al. |
| 2017/0062830 A1 | 3/2017 | Bao et al. |
| 2017/0162911 A1 | 6/2017 | Gaben |
| 2018/0051137 A1 | 2/2018 | Kim et al. |

OTHER PUBLICATIONS

International Search Report and Written Opinion for International Application No. PCT/2019/027165 mailed Aug. 16, 2019.

POROUS METAL-ION AFFINITY MATERIAL

CROSS-REFERENCE TO RELATED APPLICATION

This application is a national stage application filed under 35 U.S.C. § 371 of PCT International Application No. PCT/US2019/027165, which claims the benefit of U.S. Provisional Application No. 62/656,443 filed Apr. 12, 2018, the entire disclosures of which are hereby incorporated by reference herein.

STATEMENT REGARDING FEDERALLY SPONSORED RESEARCH

This invention was made with government support under Grant No. DE-EE0007795 awarded by the Department of Energy. The Government has certain rights in the invention.

TECHNICAL FIELD

The present disclosure relates to metals as anodes in metal batteries including a porous material which has a high affinity for metal ions such as lithium ions. The porous material has a high zeta-potential, and methods for making the material are described.

BACKGROUND

Using metals as anodes in metal batteries is considered as the most promising approach to achieve high energy density in next-generation batteries, and it is applied in commercial low-cost batteries such as zinc (Zn) metal batteries and lead acid batteries. However, the plating/stripping of metals is often compromised by metal dendritic growth, which leads to irreversible processes that reduce the Coulombic efficiency (CE) and deteriorates cycling performance. Using alkaline metal anodes, such as lithium (Li) and sodium (Na) poses a particular challenge because the metal deposition is associated with severe electrolyte decomposition due to the high reactivity of these metals, which promotes a non-uniform nucleation and the severe growth of mossy dendritic metal.

While several approaches are known for reducing or mitigating the dentritic lithium growth, obtaining dendrite-free plating/stripping of lithium with high CE at high current densities and high deposition capacities required to implement high energy and long cycling of Li metal batteries remains challenging.

In high energy density Li metal batteries, high current density directs very fast depletion of Li ions and in turn, leads to severe concentration polarization because of diffusion- and advection-limited ion transport in bulk electrolyte. To overcome the diffusion limitation at high current density, fast growth of Li dendrite occurs by focusing the ionic flux on rapidly growing dendrite tips. High Li deposition capacity accompanies the vast volume change of Li metal, which leads to a continuous cracking of solid electrolyte interphase (SEI) layers and deteriorates the morphology of deposited Li. The non-uniform deposition of Li increases its surface area, propagates SEI formation and reduces the CE of Li plating/stripping. For example, U.S. Patent Publication No. 2017/0062830 discloses high performance battery anodes with polymeric coatings. However, this reference relates to reducing the occurrence of high lithium flux locations to avoid cracking of an SEI layer. U.S. Patent Publication No. 2015/0236324 discloses a lithium-based battery separator including a porous polymer membrane.

However, there is a continuing need to improve ion transport of metal-based batteries.

SUMMARY OF THE DISCLOSURE

An advantage of the present disclosure is to provide substantially dendrite-free deposition of metal during metal plating/stripping on a current collector such as in a rechargeable battery at high deposition capacity and current density, thereby extending the cycle lives of high-areal capacity metal battery electrodes.

In an aspect of the present disclosure, a battery includes an electrolyte, a metal anode and a cathode. The metal anode includes a porous material disposed thereon to protect the metal anode. The porous material has a zeta potential with a magnitude of at least 15 mV in a non-aqueous electrolyte. The porous material can include a cross-linked polymer having segments with polar functional groups, the polar functional groups comprising one or more of O, N, P, S, and B. The polar functional groups may form at least 20% of the weight of the porous material. The metal anode may include, for example, lithium, sodium, zinc, magnesium or aluminum. Examples of the polymer include branched or unbranched polyamide, polyester, polyalkylene imine, polyalkylene oxide, or combinations thereof. The porous material may further include an inorganic compound such as, for example, $SiO_2$, $Al_2O_3$, MgO, CuO, CaO, ZnO, Si, SiO, $SrTiO_3$, $SnO_2$, $CeO_2$, NiO, $ZrO_2$, $Y_2O_3$, $TiO_2$, SiC, and a combination thereof.

In another aspect of the present disclosure, an electrode for a secondary battery includes a porous material disposed on the electrode. The porous material has a zeta potential with a magnitude of at least 15 mV in a non-aqueous electrolyte. The porous material can include a cross-linked polymer having segments with polar functional groups, the polar functional groups comprising one or more of O, N, P, S, and B. The electrode may include lithium, sodium, zinc, magnesium, aluminum, or an alloy thereof. The polar functional groups may form at least 20% of the weight of the porous material. Examples of the polymer include branched or unbranched polyamide, polyester, polyalkylene imine, polyalkylene oxide, or combinations thereof. The porous material may further include an inorganic compound such as, for example, $SiO_2$, $Al_2O_3$, MgO, CuO, CaO, ZnO, Si, SiO, $SrTiO_3$, $SnO_2$, $CeO_2$, NiO, $ZrO_2$, $Y_2O_3$, $TiO_2$, SiC, and a combination thereof.

In yet another aspect of the present disclosure, a method of making a porous material for protecting an electrode of a secondary battery includes disposing a solution of the polymer and a cross-linker on a substrate to be used as the electrode and freezing the solution. The solution is then incubated at a predetermined temperature for a period of time such that the polymer is cross-linked, the predetermined temperature being less than 0° C. The cross-linked polymer is then thawed and dried under vacuum.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention.

Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Guided by classical diffusion models of Sand's equation, essential parameters such as initial metal ion concentration, local current density, and transfer nature of metal ions dominantly affect dendrite growth of metal deposition. Reducing local current densities or enabling uniform distribution of Li ions, such as in three-dimensional (3D) porous host for Li deposition, can alleviate the growth of dendritic Li at conditions of increased current density and deposition capacity. However, achieving dendrite-free Li plating/stripping with high CEs at high areal capacity and current density remains challenging.

The present disclosure is directed to porous materials that are useful in metal batteries such as, for example, Li, Na, Zn, Mg, Al, alloys thereof, etc. batteries. Such porous materials can advantageously provide substantially dendrite-free deposition of metal during metal plating/stripping on a current collector such as in a rechargeable battery.

In an aspect of the present disclosure, a battery includes an electrolyte, a metal anode and a cathode. The metal anode includes a porous material disposed thereon to protect the metal anode. The porous material has a zeta potential with a magnitude of at least above 15 mV in the electrolyte. The porous material can include a cross-linked polymer having segments with polar functional groups. Examples of polar functional groups include, but are not limited to, those comprising one or more among O, N, P, S, and B. In an embodiment, the polar functional groups form at least about 20% by weight of the polymer.

Such a porous material can have a porosity of at least 70% such as about 70%, about 75%, about 80%, about 85%, about 90%, about 95%, or any value between any two of these values. The porous material also preferably has a zeta potential with a magnitude of at least about 15 mV, such as at least about 17 mV, about 20 mV, about 23 mV, about 25 mV, about 27 mV, about 30 mV, about 33 mV, about 35 mV, about 37 mV, about 40 mV, about 42 mV, about 45 mV, or any value between any two of these values, in a non-aqueous electrolyte.

Examples of the polymer include, without limitation, cross-linked poly(ethylenimine) (PEI), cross-linked polyamide, cross-linked polyester, cross-linked polyalkylene imine, cross-linked polyalkylene oxide, cross-linked poly (ethylene oxide), or combinations thereof.

Examples of polar functional groups include, but are not limited to, carbonyl, ether, carboxylate, phosphate, phosphite, sulfate, sulfonyl, borate, boride, nitrate, nitrite, amine, amide, etc. In an embodiment, the polar functional groups form at least about 20% of the weight of the polymer. In some embodiments, the polar functional groups form about 25% of the weight of the polymer, about 30% of the weight of the polymer, about 35% of the weight of the polymer, about 40% of the weight of the polymer, or any amount between these percentages. In some embodiments, the polar functional groups form even higher percent of the weight of the polymer. The amount of functional groups is not particularly limited so long as the functional groups in the polymer can provide the zeta potential high than ±15 mV.

Figure 1:
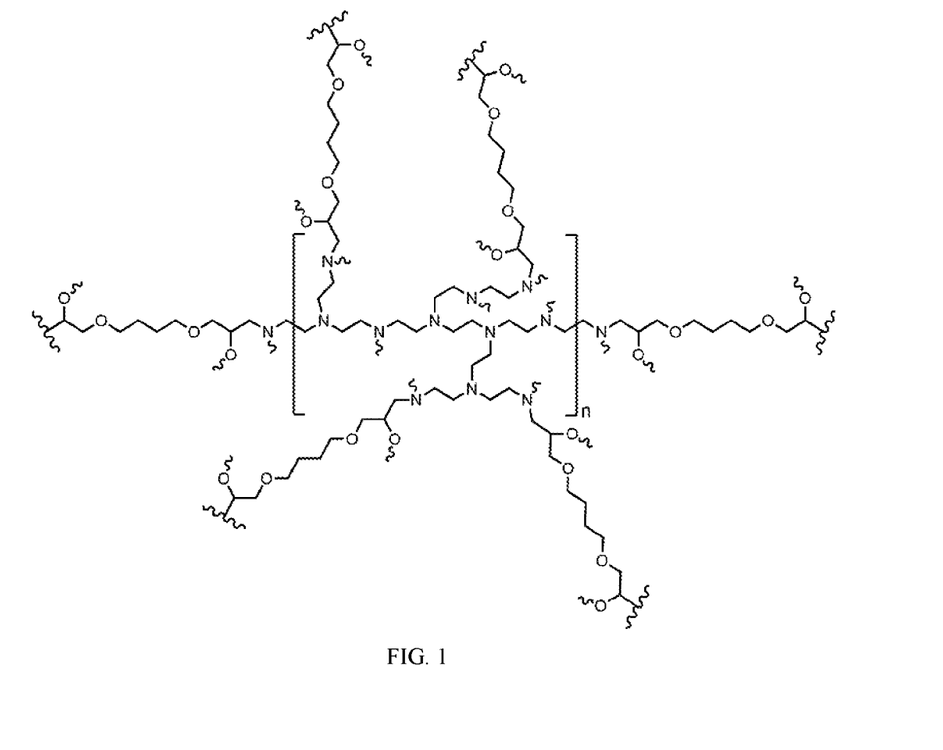
FIG. 1 shows the molecular structure of a cross-linked polymer material, in accordance with an embodiment of the present disclosure.

In an example, a nucleophilic substitution reaction is used to cross-link a polymer to result in a molecular structure similar to that shown in FIG. 1. This results in a cross-linked polymer containing segments that generate high-zeta potential. The segments, in various embodiments, include the polymer containing functional groups having N, O, P, S and/or B.

Depending on the particular polar functional groups and their amount in the porous material, the zeta potential may have a magnitude of about 15 mV or higher, such as about 17 mV, about 20 mV, about 23 mV, about 25 mV, about 27 mV, about 30 mV, about 33 mV, about 35 mV, about 37 mV, about 40 mV, about 42 mV, about 45 mV, or higher or any value between any two of these values, in a non-aqueous electrolyte. In an embodiment, the zeta potential may have an even higher magnitude such as, for example about 47 mV, or more. The zeta potential of the porous material may be positive or negative depending on the particular polar functional groups and the electrolyte. The zeta potential values of the porous material are based on experimentally determined electrophoretic mobility using a technique such as, for example, laser Doppler microelectrophoresis. In laser Doppler microelectrophoresis, an electric field is applied to a solution of tracer particles to measure electro-osmosis close to a sample surface to calculate the zeta potential of the surface. This velocity of the tracer particles is measured using, for example, light scattering. This enables the calculation of electrophoretic mobility, and from this the zeta potential and zeta potential distribution.

Suitable non-aqueous electrolytes include a non-aqueous solvent such as, for example, carbonates, N-methyl acetamide, acetonitrile, symmetric sulfones, sulfolanes, polyethylene glycols, 1,3-dioxolanes, glymes, siloxanes, ethylene oxide grafted siloxanes, or a combination thereof. A suitable non-aqueous electrolyte further includes one or more salts such as, for example, lithium chloride (LiCl), lithium hexafluorophosphate (LiPF$_6$), Lithium bis(trifluoromethanesulfonyl)imide (LiTFSI), Lithium bis(fluorosulfonyl)imide (LiFSI), lithium tetrafluoroborate (LiBF$_4$), lithium methanesulfonate (LiCH$_3$SO$_3$), lithium trifluoromethanesulfonate (LiCF$_3$SO$_3$), lithium hexafluoroarsenate (LiAsF$_6$), lithium hexafluoroantimonate (LiSbF$_6$), lithium perchlorate (LiClO$_4$), Li[BF$_2$(C$_2$O$_4$)], Li[PF$_2$(C$_2$O$_4$)$_2$], Li[N(CF$_3$SO$_2$)$_2$], Li[C(CF$_3$SO$_2$)$_3$], lithium bisoxalatoborate (Li-BOB), or a combination thereof.

The porous material is capable of affinity for metal ions such as Li-ions and promoting electrokinetic phenomena (e.g., surface conduction, electroosmotic flow) within the porous material, working as a plausible metal-ion electrokinetic self-concentrating/pumping host on a current collector for metal plating/stripping. For example, in some embodiments, the porous material can accommodate at least about 70% lithium with respect to the weight of the porous material. In other embodiments, the percentage may be higher such as, for example, about 75%, 80%, 85%, or any percentage between these two percentages. In yet other embodiments, the percentage of lithium accommodated within the porous material may be even higher such as, for example, 87%, 88% or higher. It will be understood that the weight percentages for other metal ions such as sodium and zinc are significantly higher because of the higher atomic weights of the other metals.

Thus, metal such as Li is accommodated within the material rather than merely being deposited on a surface of the material. In other words, the polymeric material disclosed herein acts as a host for the metal. The metal ions are accommodated through adsorption in pores of the porous material. In some embodiments, the porous material may have a porosity of at least about 80%. As used to herein, porosity refers to the ratio of volume occupied by pores in the porous material to the total volume of the porous material. In some embodiments, the porosity may be, for example, 85%, 90%, 95% or any value between these values. The pore volume of the pores in the porous materials may be, for example, at least about 5 cm$^3$/g. In some embodiments, the pore volume can be higher, such as, for example, 5.5 cm$^3$/g, 6 cm$^3$/g, or any value between these values, or even higher.

Upon adsorption of metal ions such as, for example, lithium ions, the ion conductivity of the porous material is at least about 3.5×10$^{-5}$ S/cm at 25° C. In some embodiments, the ion conductivity at 25° C. can be higher, such as, for example, 4×10$^{-5}$ S/cm, 5×10$^{-5}$ S/cm, 5.5×10$^{-5}$ S/cm, 6×10$^{-5}$ S/cm, 7×10$^{-5}$ S/cm, 7.5×10$^{-5}$ S/cm, 8×10$^{-5}$ S/cm, 8.5×10$^{-5}$ S/cm, 9×10$^{-5}$ S/cm, 9.5×10$^{-5}$ S/cm, or any value between these values, or even higher.

In an embodiment, the porous material additionally includes an inorganic compound such as, for example, SiO$_2$, Al$_2$O$_3$, MgO, CuO, CaO, ZnO, Si, SiO, SrTiO$_3$, SnO$_2$, CeO$_2$, NiO, ZrO$_2$, Y$_2$O$_3$, TiO$_2$, SiC, or a combination thereof. The inorganic compound improves mechanical properties of the porous material, for example, by providing it increased stiffness. In addition, the inorganic compound can help regulate the zeta potential of the composite material.

The porous material may be used, in some embodiments, as the metal anode with appropriate metal. For example, in an embodiment, a metal anode includes the porous material described herein and a metal such as lithium, sodium, zinc, magnesium or aluminum.

In an embodiment, the porous material includes a 3D polymeric porous sponge. Strong affinity for metal ions such as Li ion (and analogous metal ions) from the 3D cross-linked porous polyethylenimine sponge (PPS) not only self-concentrates Li ions in the sponge, but also drives the formation of interfacial electric double layer (EDL). The self-concentration of Li ions leads to higher local concentration of Li ions than bulk solution. The formation of the EDL promotes electrokinetic phenomena and provides electrokinetic self-concentrating/pumping feature during Li plating/stripping. The electrokinetic self-concentrating/pumping provides additional ion transport mechanism to make ions reach the depletion area faster than by electro-diffusion, especially at high rates. Together, the Li-ion electrokinetic self-concentrating/pumping properties of the 3D PPS can reduce the concentration polarization, overcome diffusion limited current, and therefore regulate the Li-ion concentration difference in deionization area to enable a uniform Li-ion distribution, in turn lead to a dendrite-free, uniform and conformal deposition of Li metal within the 3D PPS host at both high current density and high deposition capacity. Moreover, Li metal can be accommodated in the porous structure avoiding large volume change to maintain integrity of the deposited Li layer.

Figure 2A:
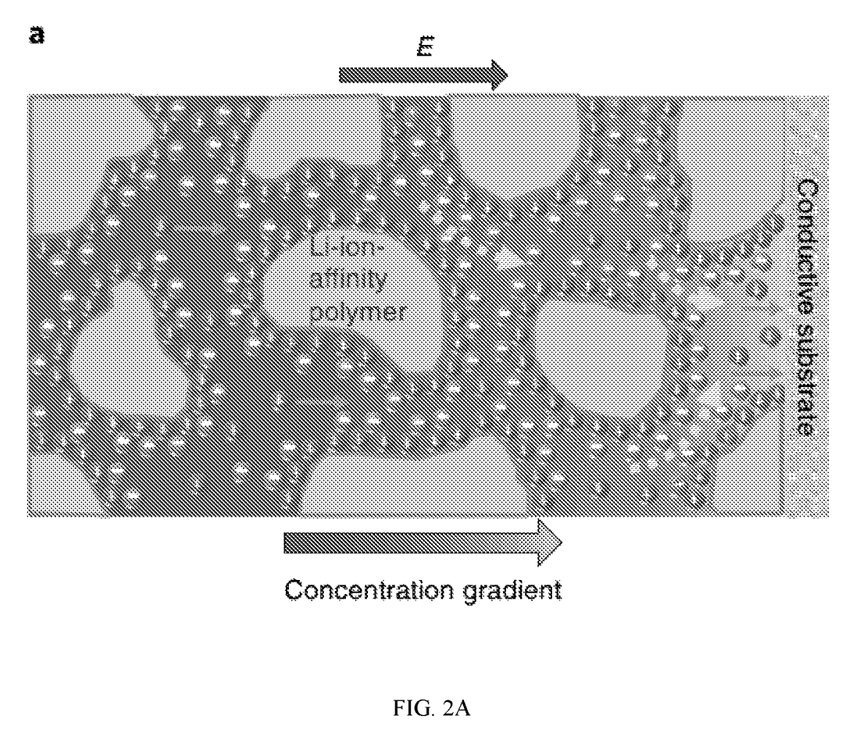
FIG. 2A is a schematic of the electrokinetic phenomena in 3D polymeric porous sponge (3D PPS) under an electric field, in accordance with an embodiment of the present disclosure.
Figure 2B:
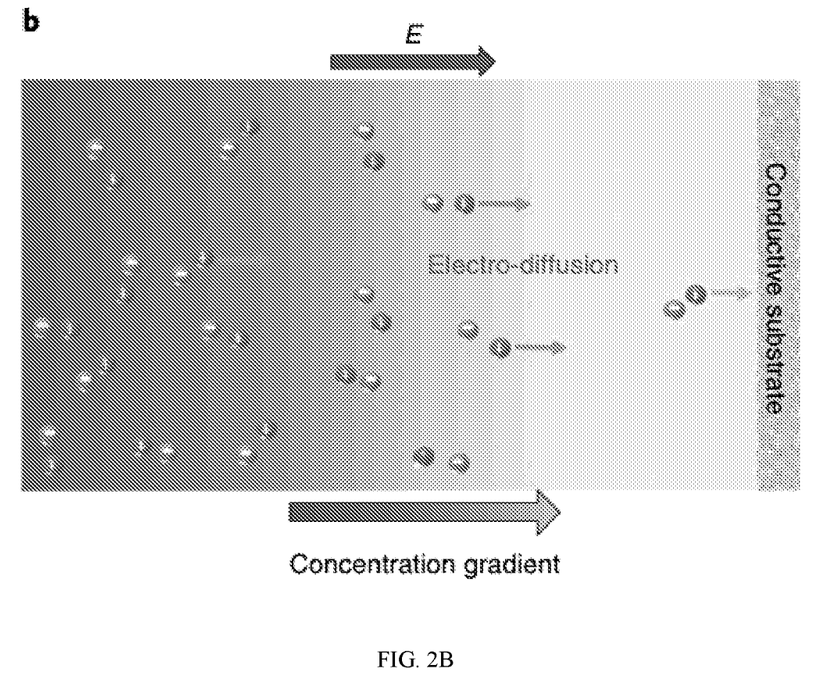
FIG. 2B is a schematic of electro-diffusion in a conventional cell under an electric field.

FIGS. 2A and 2B show the physics behind the effectiveness of a porous material. In FIG. 2A the long curved arrows represent electrokinetic surface conduction, the dashed arrows represent electro-osmosis and the short straight arrows represent the movement of the cations. Electrokinetic surface conduction and electro-osmosis can, thus, reduce the concentration polarization. FIG. 2B, in contrast, shows electro-diffusion in a conventional cell under an electric field.

Such 3D PPS can be provided as a coating on a current collector of a battery. For example, in an embodiment, a copper current collector is provided with a suitable polymer or polymer precursors and crosslinker, and then the polymer is crosslinked on the copper current collector. The polymer is, for example, polyethylenimine (PEI) in some embodiments. Various methods for providing the 3D PPS coating on a copper current collector include, for example, ice-templating method, hard-templating method, freeze-drying method, doctor-blade coating method, etc.

In an embodiment, an ice-templating method includes preparing a 3D PPS directly on copper current collectors through cross-linking a polymer such as, for example, branched PEI using a crosslinker such as, for example, 1,4-butanediol diglycidyl ether (BGE) by pouring a solution of branched PEI and BGE on to a copper foil and freezing the foil and the solution with, for example, liquid nitrogen. This is followed by incubating the foil and the solution at, for example, −10° C. to allow crosslinking to proceed. The foil and the solution are then, thawed, washed and dried to obtain the 3D PPS directly on copper.

In an embodiment, the 3D PPS has a porosity of at least 80% with a pore volume of at least 5 cm$^3$/g. As referred to herein, porosity is expressed as a percentage of pore space in the total volume of the material.

In embodiment, the 3D PPS has a high zeta potential such as, for example, greater than about ±15 mV. In other words, the magnitude of the zeta potential of the 3D PPS is at least about 15 mV, such as, about 15 mV, about 17 mV, about 20 mV, about 23 mV, about 25 mV, about 27 mV, about 30 mV, about 33 mV, about 35 mV, about 37 mV, about 40 mV, about 42 mV, about 45 mV, or any value between any two of these values, in a non-aqueous electrolyte. The zeta potential of the porous coating is dependent on the composition of the coating. Thus, certain materials and/or functional groups are preferred for obtaining a high zeta potential for the 3D PPS. For example, porous coatings prepared from polymers with high density (>20 wt %) of O, N, P, S, B atoms or inorganic compounds (e.g. $SiO_2$, $Al_2O_3$, MgO, CaO, ZnO, Si, SiO), or polymer/inorganic compound composites can have a zeta potential of greater than ±15 mV. With appropriate selection of the functional group and composition and a suitable electrolyte, zeta potential of ±30 mV or even as high as ±42 mV can be obtained. In some embodiments, the porous coating includes a porous crosslinked polyethylenimine (PEI) sponge.

Figure 3:
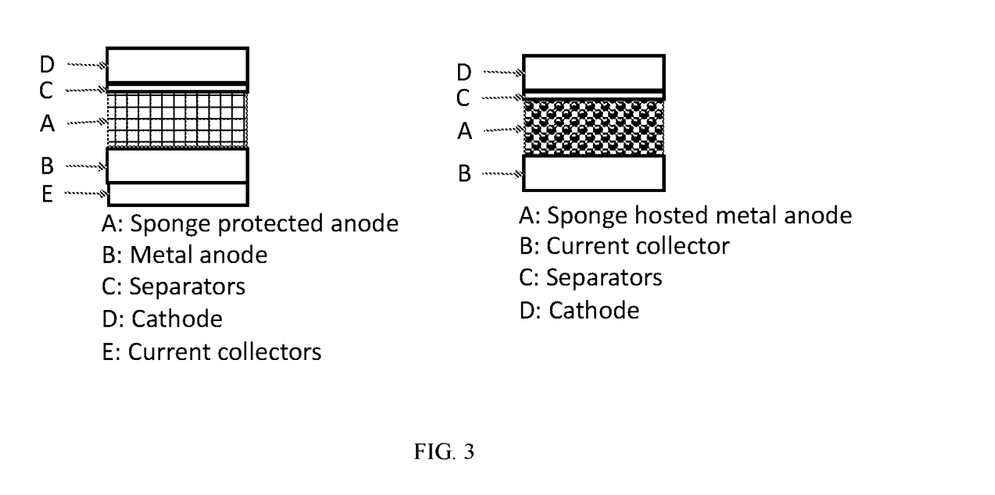
FIG. 3 schematically illustrates the porous sponge as protective layer (left) or host layer (right) for metal anodes of rechargeable metal batteries, in accordance with an embodiment of the present disclosure.

As shown in FIG. 3, the 3D PPS can be coated on a current collector of the battery, e.g., a copper current collector, or coated on a separator. The porous coating can also be coated on cathode or anode materials and used as a binder. In an embodiment, the 3D PPS is used as a protective layer or a host layer for metal anodes of rechargeable metal batteries. Metal anodes such as, for example, lithium, sodium, magnesium, zinc, aluminum, etc. can be used in rechargeable batteries. In an embodiment, the rechargeable battery includes a cathode of $LiFePO_4$. Other cathodes can also be used with the porous coating in the rechargeable battery of the present disclosure such as include NCM, sulfur. In embodiment, the separator is selected from one of polyolefin microporous membrane, modified polypropylene fabric, polyethylene fabric, glass fiber fabric, superfine glass fiber paper, vinylon fabric, or composite membrane of nylon fabric, and wettable polyolefin microporous membrane composited by welding or bonding.

In an embodiment, the electrolyte is, for example, lithium bis(trifluoromethanesulfonyl)imide (LiTFSI) in 1,3-dioxolane (DOL) and 1,2-dimethoxyethane (DME). In some embodiments, the electrolyte includes, for example, a solvent selected among carbonates, N-methyl acetamide, acetonitrile, symmetric sulfones, sulfolanes, polyethylene glycols, 1,3-dioxolanes, glymes, siloxanes, ethylene oxide grafted siloxanes, or blends thereof, and a salt selected among lithium chloride (LiCl), lithium hexafluorophosphate ($LiPF_6$), Lithium bis(trifluoromethanesulfonyl)imide (LiTFSI), Lithium bis(fluorosulfonyl)imide (LiFSI), lithium tetrafluoroborate ($LiBF_4$), lithium methanesulfonate ($LiCH_3SO_3$), lithium trifluoromethanesulfonate ($LiCF_3SO_3$), lithium hexafluoroarsenate ($LiAsF_6$), lithium hexafluoroantimonate ($LiSbF_6$), lithium perchlorate ($LiClO_4$), $Li[BF_2(C_2O_4)]$, $Li[PF_2(C_2O_4)_2]$, $Li[N(CF_3SO_2)_2]$, $Li[C(CF_3SO_2)_3]$, lithium bisoxalatoborate (LiBOB), or combinations thereof.

Without wishing to be bound by theory, the high zeta potential in electrolyte for the 3D PPS signifies formation of an EDL in the 3D PPS, which provides the electrokinetic phenomena, such as electrokinetic surface conduction and electroosmotic flow, within the sponge under an electric field, thereby eliminating the formation of dendrites during the Li plating/stripping process. When used in a lithium-based rechargeable battery as discussed elsewhere herein, the 3D PPS enables lithium deposition with a dendrite-free morphology. In an embodiment, the 3D PPS accommodates a maximum of at least 70 wt. % lithium with respect to the weight of the 3D PPS with a substantially dendrite-free morphology.

In an embodiment, the surface conductivity of solid Li-ion-adsorbed 3D PPS is at least about $9.6 \times 10^{-5}$ S/cm at 25° C.

In an embodiment, the porous material is in the form of a porous film (also referred to herein as a "leaky film"). In an embodiment, the leaky film is disposed on Li metal and together with the Li metal, forms an Li metal anode for a rechargeable battery. In an embodiment, the leaky film is composed of crosslinked polyethylenimine (PED-based polyurea (PEIPU), poly(ethylene oxide) (PEO) and Sift nanoparticles ($PEIPU-PEO-SiO_2$).

In an embodiment, a method for making the leaky film includes successively coating a $PEI-SiO_2-PEO$ colloidal solution and a suitable crosslinker solution such as, for example, hexamethylene diisocyanate (HDI) solution onto the substrate, followed by in situ crosslinking between PEI and HDI. For example, in an embodiment, PEI and PEO were dissolved in NMP, to this polymer solution, $SiO_2$ nanoparticles were added and the mixture was stirred to get a homogenous dispersion A. HDI and DBTDL were added in NMP to form solution B. The homogenous dispersion A was firstly coated on Cu foil or thin Li foil with a doctor blade, then solution B was coated on the top of dispersion A layer. The obtained coating film was dried under vacuum to get the PPS leaky film on Cu foil or Li foil.

Without wishing to be bound by theory, the chemical structure and Li-ion affinity of the results in the leaky film being able to self-concentrate the Li-ions and also induce the electrokinetic phenomena to enhance the Li ion transport. Additionally, the Li-ion affinity of the leaky film drives the formation of EDL on the leaky film surface. For example, in a suitable electrolyte such as, for example, lithium hexafluorophosphate ($LiPF_6$) in ethylene carbonate (EC) and diethyl carbonate (DEC), a $PEIPU-PEO-SiO_2$ leaky film has a zeta potential of about 36 mV, and surface ion conductivity of at least about $3.5 \times 10^{-5}$ S/cm.

Thus, the leaky film-Li metal anode is suitable for use in a rechargeable battery. In an embodiment, a rechargeable battery includes a leaky film-Li metal anode and NCM or $LiFePO_4$ as a cathode.

Another aspect of the present disclosure includes a battery including a metal anode comprising the porous polymeric material described herein. The battery further includes a suitable electrolyte, a separator and a cathode. The metal anode includes, for example, lithium, sodium, magnesium, zinc or aluminum. Examples of suitable separators include, without limitation, polyolefin microporous membrane, modified polypropylene fabric, polyethylene fabric, glass fiber fabric, superfine glass fiber paper, vinylon fabric, or composite membrane of nylon fabric, and wettable polyolefin microporous membrane composited by welding or bonding.

As further illustrated by the examples provided elsewhere herein, the porous material can be formed as a polymeric 3D porous sponge, a polymer-inorganic material composite, or a leaky film. The examples further illustrate the various methods of making each form of the porous material, and their physical and electrical characteristics, as well as their use in batteries.

EXAMPLES

The following examples are intended to further illustrate certain preferred embodiments of the disclosure and are not limiting in nature. Those skilled in the art will recognize, or be able to ascertain, using no more than routine experimentation, numerous equivalents to the specific substances and procedures described herein.

Example 1: 3D Polymeric Porous Sponge (PPS) on Copper

Branched PEI ($M_w \approx 25,000$, 144 mg) was dissolved into 5.76 g of deionized water, and to this polymer solution the crosslinker BGE (120 mg) was added. Then the solution was poured into a Petri dish that contained Cu foil at the bottom. The Petri dish was immediately frozen in liquid nitrogen (with the solution frozen on the top surface of Cu foil) and then refrigerated (−10° C.) for 48 h to allow the cross-linking to proceed. After the crosslinking process, the Petri dish was thawed at room temperature, after which the as-prepared product was washed with deionized water several times and dried under vacuum to afford the desired 3D PPS@Cu. The SEM images reveal a sponge-like porous structure that contains irregularly shaped pores with pore diameters that range from 5 to 500 μm and a pore wall thickness of around 550 nm. The 3D PPS has a pore volume of ~5.5 cm$^3$/g and a porosity of 87%

The SEM images show the compact and dendrite-free Li grows on the Cu surface upward and conformally fills porous structures of 3D PPS sponge. Based on the pore volume and porosity of the 3D PPS sponge, the sponge can accommodate as high as 74.6 wt % of deposited Li within the sponge host.

SEM observations were performed on a scanning electron microscope (Nano630 FE-SEM). Fourier transform infrared spectroscopy was performed on a Bruker Vertex V70 spectrometer in the diffuse reflection mode with a Spectra Tech Collector II accessory. XPS measurements (e.g., elemental mapping analysis) were carried out with a Kratos XSAM800 Ultra spectrometer. The Li-ion concentration was analysed using a Perkin-Elmer Optima 5300 inductively coupled plasma emission spectrometer. The zeta potential was measured using a Malvern Zetasizer ZS. The electrochemical impedance spectroscopy data were recorded using a Solartron SI1287 Electrochemical Interface by applying a sine wave with an amplitude of 5 mV over a frequency range of 100 kHz to 0.1 Hz.

Fourier transform infrared spectroscopy (FTIR) of 3D PPS presents the vibration peaks at ~1102 and ~1288 cm$^{-1}$ ascribed to the C—O and C—N bonds, respectively. The polar groups (amine and ether) have a strong affinity with Li ions and thus endow the 3D PPS abilities to adsorb and self-concentrate Li ions within the sponge, as verified by a Li-ion adsorption experiment that shows a higher ionic concentration within the sponge than in the bulk solution.

The Li-ion-affinity groups direct the formation of EDL in 3D PPS with a high zeta potential of approximately +42 mV in the electrolyte (1.0 M lithium bis(trifluoromethanesulfonyl)imide (LiTFSI) in 1,3-dioxolane (DOL) and 1,2-dimethoxyethane (DME) with a volume ratio of 1:1).

The PPS particles are dispersed in the electrolyte, an electric field is applied to the dispersion and particle motion is measured by light scattering. Based on the motion, zeta potential can be calculated. The PPS particles were obtained by disposing the 3D PPS on a substrate and the scratching the particles from the substrate. The particle size of the 3D PPS particles was in a range from about 800 nm to about 900 nm in diameter. The zeta potential of PPS particles was carried out using a Malvern Zetasizer ZS.

The existence of EDL promotes electrokinetic phenomena, such as electrokinetic surface conduction and electro-osmosis, within the sponge under an electric field. To demonstrate the presence of the surface conduction of 3D PPS, ion conductivity was measured of solid-state porous Li-salt-adsorbed 3D PPS, which can reach 9.62×10$^{-5}$ S/cm at 25° C., remarkably higher than that of the dense Li-salt-containing cross-linked branched PEI film (2.73×10$^{-7}$ S/cm at 25° C.) (see example 3 for details on how the Li-salt-containing cross-linked branched PEI film was fabricated). This result indicates surface-adsorbed Li ions, even in solid form, have faster transport along the surfaces of the 3D PPS walls than Li ions in the bulk polymer. In liquid electrolyte, owing to the EDL of 3D PPS, the Li-ion concentration in the EDL is higher than bulk liquid electrolyte leading to a higher conductivity of this EDL layer. The electrokinetic surface conductivity provides an additional conductivity of an electrolyte in the vicinity of charged surfaces of 3D PPS.

Measurement of Electro-Osmosis.

Branched PEI (0.432 g) and BGE (0.36 g) were dissolved in 5.76 ml of deionized water to form a solution. Then, the inner walls of plastic microtubes (polycarbonate, inner diameter of 850 μm) were wetted by the solution and heated at 60° C. for 6 h to obtain the cross-linked branched PEI-modified plastic microtubes, which were cut into 1.8 cm lengths and used as microchannels to measure the electro-osmosis. An unmodified plastic microtube (1.8 cm in length) was used as a control. The electrolyte was 1 M LiTFSI in DOL and DME (v/v=1). Rhodamine B dye was used to mark the flow of the electrolyte. An electric field (5 V cm$^{-1}$) was applied to drive the electro-osmosis. It was observed that the electro-osmosis can induce an enhanced mass transport within the porous structure even in a closed system.

Figure 4:
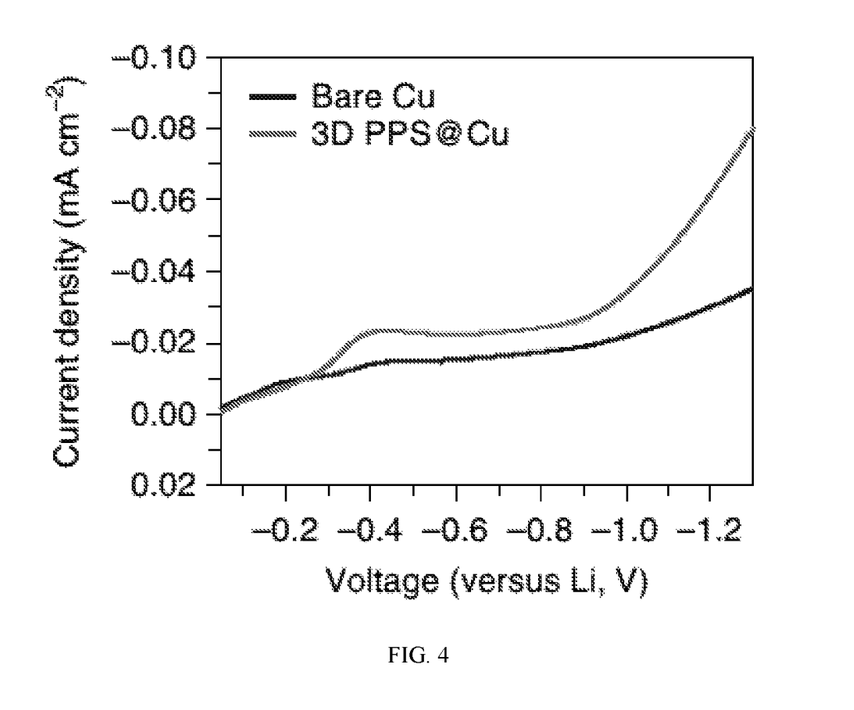
FIG. 4 shows linear sweep voltammetry data for 3D PPS@Cu, in accordance with an embodiment of the present disclosure.
Figure 5A:
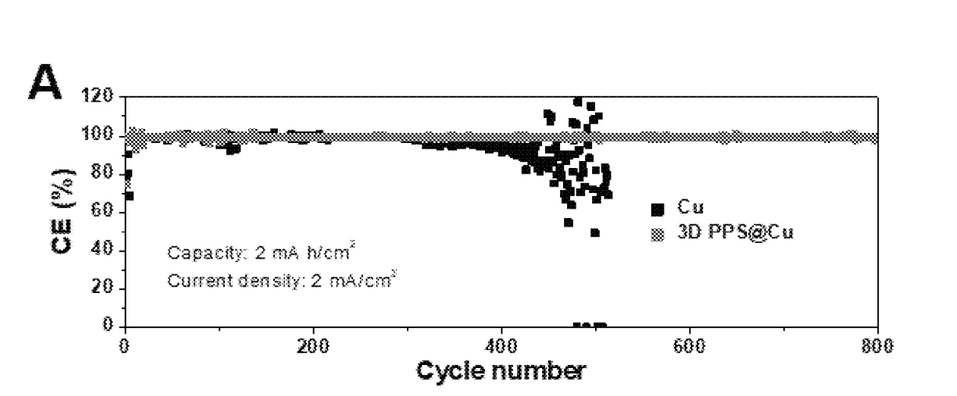
FIG. 5 shows cycling stability of Li plating/stripping of 3D PPS@Cu electrodes and electrochemical performance of full cells using 3D PPS@Cu with limited Li as anodes and LiFePO$_4$ as cathodes, in accordance with an embodiment of the present disclosure.
Figure 5B:
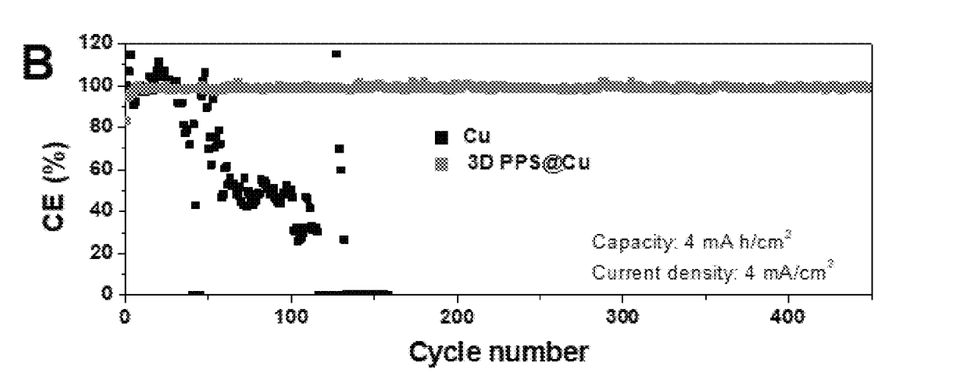
Figure 5C:
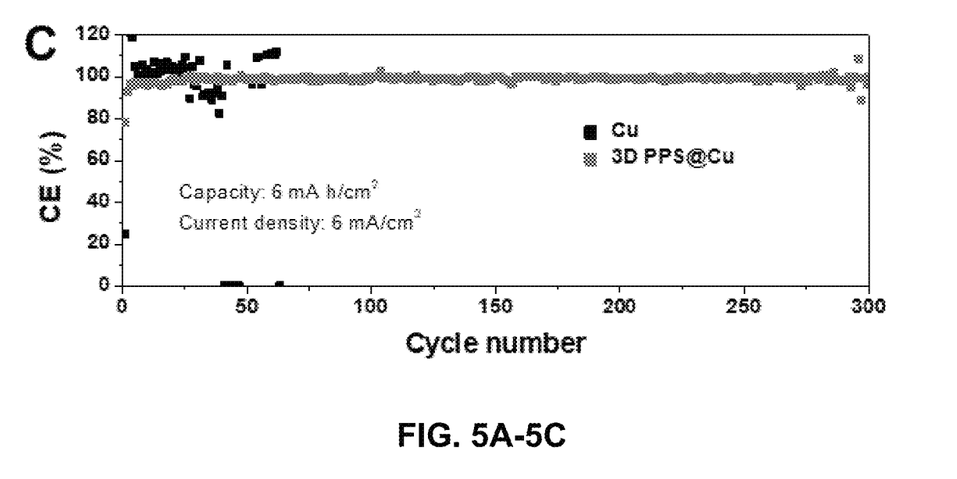
Figure 5D:
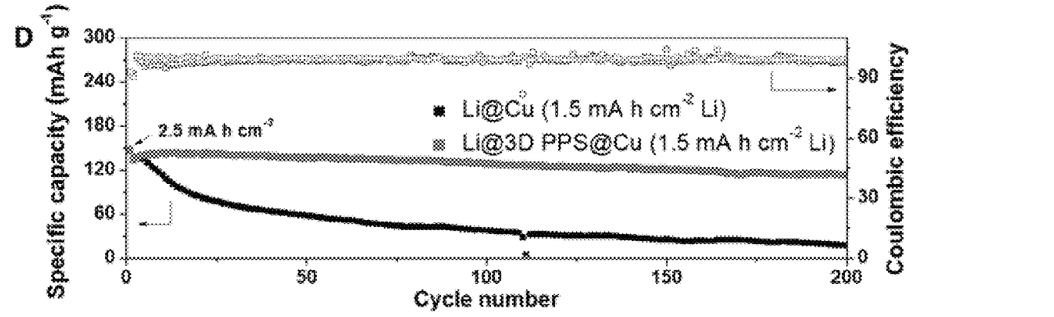
Figure 5E:
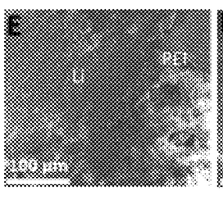
Figure 5F:
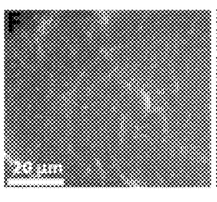
Figure 5G:
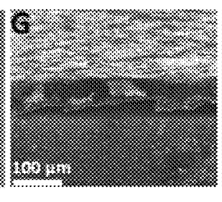
Figure 5H:
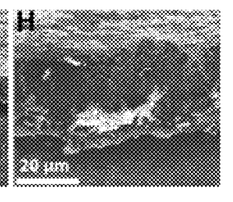
Figure 5I:
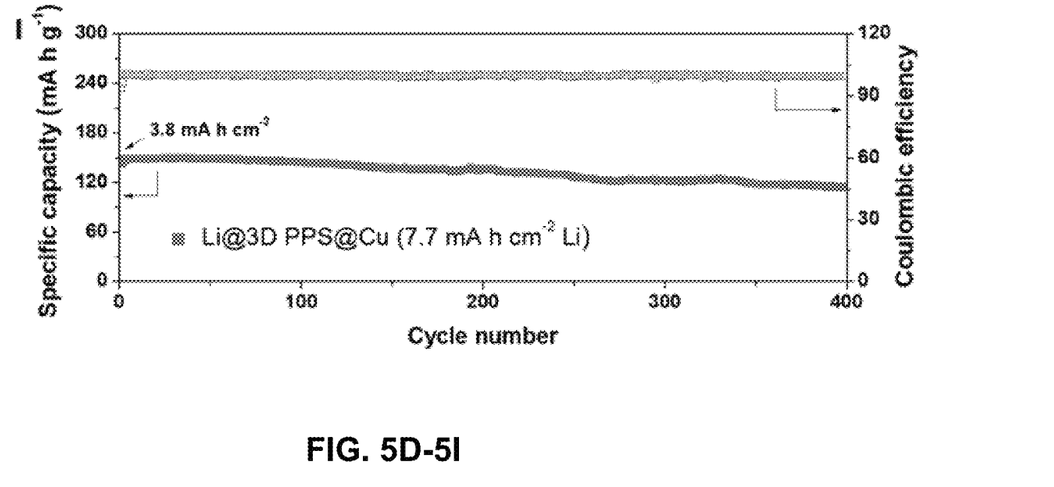

Linear sweep voltammetry (LSV) was used to experimentally manifest these features of 3D PPS that can increase the local Li-ion concentration and enhance Li-ion transport so as to overcome the diffusion-limited current for Li deposition. FIG. 4 shows LSV of 3D PPS@Cu. As seen in FIG. 4, a plateau with a higher diffusion-limited current over that of bare Cu electrodes at a voltage range between 0.4 V and 0.8 V, owing to a higher local Li-ion concentration within 3D PPS@Cu. Above a voltage of 0.8 V in the LSV, the significantly increased current density of 3D PPS@Cu over bare Cu electrodes can be attributed to the enhanced Li-ion transport that originates from electrokinetic surface conduction and electroosmosis within 3D PPS.

Benefiting from the electrokinetic self-concentrating/pumping effects of 3D PPS, dendrite-free Li deposition on 3D PPS@Cu at both high deposition capacity and high current density for a variety of electrolyte was demonstrated. SEM images of Li metal deposited on the Cu foil and 3D PPS@Cu at a deposition capacity of 2 mAh cm$^{-2}$ and current density of 2 mA cm$^{-2}$. SEM images of Li metal deposited on the Cu foil and 3D PPS@Cu at a deposition capacity of 6 mAh cm$^{-2}$ and current density of 6 mA cm$^{-2}$. The electrolyte used for these samples was 1.0 M LiTFSI in DOL and DME (v/v=1) with 1 wt % LiNO$_3$. Compared with control Cu foil electrodes typical of mossy and dendritic structure of Li, 3D PPS@Cu exhibit a uniform, compact and dendrite-free Li conformally filling the porous structure at various deposition capacities and current densities in ether-based electrolyte (e.g., at 2 mAh cm$^{-2}$ and 2 mA cm$^{-2}$; 2 mAh cm$^{-2}$ and 4 mA cm$^{-2}$; 4 mAh cm$^{-2}$ and 4 mA cm$^{-2}$; 4 mAh cm$^{-2}$ and 6 mA cm$^{-2}$). After 50 cycles of Li plating/stripping, growth of dendritic or mossy Li can still be effectively suppressed.

Remarkably, at extremely high deposition capacities and current densities the deposited Li still shows a uniform and compact morphology and conformal structure within 3D PPS, in contrast to aggressive growth of mossy and dendritic Li in bare Cu control electrodes. Strikingly, even at low temperatures, prone to the growth of Li dendrite due to lowered Li-ion mobility as shown on bare Cu electrodes, uniform and dendrite-free Li deposition is still observed conformally filling the porous structure of 3D PPS at a high current density of 20 mA cm$^{-2}$ and a deposition capacity of 4 mAh cm$^{-2}$ (0° C. and −10° C.). 3D PPS also exhibits superior dendrite-free morphology of Li plating in carbonate-based or highly concentrated electrolyte (see experimental methods) over bare Cu electrodes at both high deposition capacities and current densities (e.g., 6 mAh cm$^{-2}$ and 6 mA cm$^{-2}$). Interestingly, the 3D PPS maintains its porous structure and integrity as a host free of any crack and collapse after the repeated Li plating/stripping, likely due to its good elastic properties.

Electrochemical Measurements.

The uniform and dendrite-free deposition of Li metal leads to significant improvement of cycling performance of Li plating/stripping. Coin-type asymmetric 3D PPS@Cu foil|Li cells were used to examine the cycling stability of the 3D PPS@Cu electrode for Li plating/stripping. Highly concentrated electrolyte was used in the investigation because of high CE of Li plating/stripping achieved at low deposition capacity, as reported.

Galvanostatic experiments were performed using a Lathe battery testing station at room temperature. The process of Li metal plating/stripping was investigated using a two-electrode configuration assembled in CR2016-type coin cells (MTI Corporation) composed of a Li metal electrode and a 3D PPS@Cu electrode (substrate for Li plating/stripping). All the cells were assembled in an argon-filled glove box. The CE of Li plating/stripping was calculated from the ratio of Li removed from the substrate to that deposited during the same cycle. The symmetric cell was assembled using Li metal as the counter/reference electrode and Li@3D PPS@Cu as the working electrode. For the long-term galvanostatic discharge/charge test, 4 mAh cm$^{-2}$ of Li was first deposited on the 3D PPS@Cu at a current density of 4 mA cm$^{-2}$ and the cells were then charged and discharged at 4 mA cm$^{-2}$ for 0.5 h in each half cycle. The LiFePO$_4$ cathodes (areal capacity, 2.5 mAh cm$^{-2}$ and 3.8 mAh cm$^{-2}$) were made using a typical N-methyl-2-pyrrolidone slurry coating method with LiFePO$_4$, Super C and PVDF binder with a mass ratio of 90:5:5 on aluminum foil. The electrolyte used in the full cell was 4 M LiFSI in DME. The full cells were cycled between 2.8 and 3.8 V versus Li/Li$^+$ at a charging current density of 0.3 mA cm$^{-2}$ and a discharge current density of 1.0 mA cm$^{-2}$ using a Lathe battery testing station. LSV was collected using a CHI 660E electrochemical workstation at a scan rate of 10 mV s$^{-1}$ from 0 to −2.0 V. EIS data were recorded using a Solartron SI1287 Electrochemical Interface by applying a sine wave with an amplitude of 5 mV over a frequency range of 100 kHz to 0.1 Hz. The ether-based electrolyte used for Li deposition was 1.0 M LiTFSI in DOL and DME (v/v=1) with 1 wt % LiNO$_3$, which was also used for the investigation of the morphology evolution. The carbonate-based electrolyte used for Li deposition was 1 M lithium hexafluorophosphate and 15 wt % fluoroethylene carbonate in ethylene carbonate and diethyl carbonate (v/v=1). The electrolyte used for Na deposition was 1 M NaSO$_3$CF$_3$ in diglyme. The electrolyte used for Zn deposition was zinc di(bis(trifluoromethylsulfonyl)imide) in butyltrimethylammonium bis(trifluoromethylsulfonyl)imide (mol/mol=¼).

FIG. 5 shows cycling stability of Li plating/stripping of 3D PPS@Cu electrodes and electrochemical performance of full cells using 3D PPS@Cu with limited Li as anodes and LiFePO$_4$ as cathodes. Panel A shows CE of Li deposition on 3D PPS@Cu and bare Cu foil at the current density of 2 mA cm$^{-2}$ and the deposition capacity of 2 mAh cm$^{-2}$. Panel B shows CE of Li deposition on 3D PPS@Cu and bare Cu foil at the current density of 4 mA cm$^{-2}$ and the deposition capacity of 4 mAh cm$^{-2}$. Panel C shows CE of Li deposition on 3D PPS@Cu and bare Cu foil at the current density of 6 mA cm$^{-2}$ and the deposition capacity of 6 mAh cm$^{-2}$. Panel D shows cycling performance of full cells using 1.5 mAh cm$^{-2}$ Li on 3D PPS@Cu and bare Cu as anodes, respectively. Panels E and F show top-view SEM images of Li@3D PPS@Cu in the full cell after 50 cycles. Panels G and H show cross-section SEM images of Li@3D PPS@Cu in the full cell after 50 cycles. Panel I shows cycling performance of full cells using 7.7 mAh cm$^{-2}$ Li on 3D PPS@Cu as anodes.

The 3D PPS@Cu electrodes exhibit far improved CE and cycling stability as compared with bare Cu electrode. When measured at a deposition capacity of 2 mAh cm$^{-2}$ and a current density of 2 mA cm$^{-2}$, the cells with 3D PPS@Cu electrodes exhibit a long cycle life over 800 cycles with a high average CE of 99.1% (see FIG. 5, panel A). When elevating the deposition capacity to 4 mAh cm$^{-2}$ and the current density to 4 mA cm$^{-2}$, the 3D PPS@Cu electrodes display excellent cycling performance with a high average CE of 99% over 450 cycles (FIG. 5, panel B). More notably, under an extremely high deposition capacity and current density (6 mAh cm$^{-2}$ and 6 mA cm$^{-2}$), the 3D PPS@Cu electrodes shows a peerless Li plating/stripping performance to date with an average CE of 98.9% for more than 300 cycles (FIG. 5, panel C). Even at a high rate of 5 C (a current density of 20 mA cm$^{-2}$ and a deposition capacity of 4 mAh cm$^{-2}$), the 3D PPS@Cu electrodes still deliver a high average CE of 97.8% for 180 cycles. Note that the 3D PPS@Cu electrodes also exhibit significantly enhanced CE and cycling life of Li plating/striping in both ether-based electrolyte and carbonated-based electrolyte at high deposition capacities and current densities. Although XPS spectra indicate the components of SEI layers formed on 3D PPS@Cu are similar to those formed on Cu foil in these electrolytes, the voltage hysteresis during Li plating/stripping reveals the SEI layers formed in the cells containing 3D PPS@Cu electrodes are more stable, which is mainly attributed to the 3D PPS not only enabling dendrite-free deposition of Li but also accommodating volume change during Li plating/stripping so as maintain the integrity of the SEI layer and improve the CE.

The high CE of Li plating/stripping within 3D PPS@Cu would allow fabrication of 3D PPS@Cu with limited Li (designated as Li@3D PPS@Cu) as an anode to achieving a high-energy-density Li metal battery while maintaining excellent cycling life. Full cells assembled by using Li@3D PPS@Cu anodes and LiFePO$_4$ cathodes have been shown to be advantageous. As can be seen in FIG. 5, panel D a full cell with 1.5 mAh cm$^{-2}$ Li on current collectors as anodes and 2.5 mA h cm$^{-2}$ LiFePO$_4$ as cathodes (area capacity ratio of Li negative to positive electrodes, namely N/P ratio, is 0.6) demonstrates excellent cycling performance. The cells using Li@3D PPS@Cu deliver an initial discharge capacity of 146.7 mAh g$^{-1}$ and maintain an average CE of ~99.7% and stable cycling performance over 200 cycles. In contrast, the control cell with the same N/P ratio shows a very fast capacity decay, the capacity drops to 17.7 mAh g$^{-1}$ after 200 cycles with a poor average CE of ~98.3%. Consistently, Li@3D-PPS@Cu after 50 cycles show a uniform and compact structure free of mossy and dendritic Li, as shown in SEM images in FIG. 5 (panels E-H), which consolidates 3D PPS enables a dendrite-free Li deposition in the full cells.

The amount of Li in Li@3D PPS@Cu to 4.6 and 7.7 mA h cm$^{-2}$ was further increased to pair high-areal-capacity LiFePO$_4$ (~3.8 mA h cm$^{-2}$) cathodes (N/P ratios are 1.2 and 2, respectively). The high-areal-capacity LiFePO$_4$ cathode during charge/discharge process can examine the stability of Li anode at high deposition capacity in full cell system. Cells with 4.6 mAh cm$^{-2}$ Li@3D PPS@Cu anodes can deliver an initial discharge capacity of 149.1 mAh g$^{-1}$ and stable cycling of almost 300 cycles with an average CE of ~99.8%. For the cells with 7.7 mAh cm$^{-2}$ Li@3D PPS@Cu anodes (see FIG. 5, panel I), the initial discharge capacity as high as 148.8 mAh g$^{-1}$ is achieved, then the cells maintain a high average CE of 99.78% and a stable cycling performance for over 400 cycles. It is worth noting that the 3D PPS is lightweight, the gravimetric energy density of Li metal battery cannot be adversely affected when the 3D PPS is used.

Comparative Example 1: Dense Crosslinked PEI Film

Branched PEI (M$_w$≈25,000, 3.24 g) and the cross-linker BGE (2.7 g) were dissolved in 35 ml of deionized water. The aqueous solution was poured into a polytetrafluoroethylene mould and heated at 65° C. for 24 h to give the cross-linked film. After drying at 100° C. under vacuum for 24 h, the dense cross-linked PEI film was obtained.

Comparative Example 2: 3D Porous PVDF on Copper 3D porous sponge made from poly(vinylidene fluoride) (PVDF) with a certain pore volume and porosity was synthesized to demonstrate important roles of functional groups and/or zeta potential on generating electrokinetic self-concentrating/pumping effects.

3D porous PVDF@Cu was prepared using NaCl as the hard template. The NaCl particles were first ball-milled into micromillimetre-sized particles. Then, PVDF 534,000, 80 mg) and ballmilled NaCl (1.9 g) were added into N-methyl-2-pyrrolidone (0.92 g) and the mixture was stirred for 2 d to form a uniform slurry. The PVDF-NaCl film@Cu was made by coating the slurry on Cu foil with a doctor blade. After the PVDF-NaCl film@Cu was fully dried, the NaCl particles were removed by immersing in deionized water to obtain the 3D porous PVDF@Cu. The 3D porous PVDF@Cu was further dried in a vacuum oven at 100° C. overnight before the electrochemical characterization. The zeta potential of the 3d PVDF@Cu sponge was observed to be around −7 mV in the same electrolyte.

It was observed that mossy and fluffy Li still grows within the 3D PVDF sponge structure. This can be ascribed to the remarkable Li plating behavior within the 3D PPS to the Li-ion electrokinetic self-concentrating/pumping effect that originates from Li-ion affinity properties and electrokinetic surface conduction and electroosmosis induced mass transport within the high-zeta-potential cross-linked 3D PPS materials under an electric field. The effects collectively raise the average Li-ion concentration level at the surface of plated Li, efficiently compensate Li-ion depletion and mitigate the surface concentration difference, leading to uniform local current density distribution and thus more even Li plating morphology.

Example 2: Solid-State Porous Li-Salt Adsorbed 3D PPS

Solid-state porous Li-salt adsorbed 3D PPS was prepared for the measurement of the Li-ion surface conductivity. Four drops of the highly concentrated electrolyte (4 M lithium bis(fluorosulfonyl)imide (LiFSI) in DME) were dropped on the 3D PPS@Cu, and then the solvent was immediately evaporated (120° C. under vacuum for 2 d) to obtain the solid-state 3D PPS with only the Li ions adsorbed on the surface of the 3D PPS walls. The as-prepared solid-state porous Li-salt-adsorbed 3D PPS was used to test surface ionic conductivity.

Example 3: Dense Li-Salt-Containing Cross-Linked Branched PEI Film

Branched PEI (0.324 g), BGE (0.27 g) and LiFSI (0.2376 g) were dissolved in 10 ml of deionized water. The aqueous solution was poured into a polytetrafluoroethylene mould and heated at 65° C. for 24 h to give a cross-linked film. After drying at 100° C. under vacuum for 24 h, the dense Li-salt-containing cross-linked PEI film was obtained.

Example 4: Leaky Film

Leaky films on Cu or Li substrates (designated as leaky film@Cu or leaky film@Li, respectively) were prepared by successive coating of PEI-SiO$_2$-PEO colloidal solution and hexamethylene diisocyanate (HDI) solution onto the substrate, followed by in situ crosslinking between PEI and HDI.

Fourier Transform infrared (FTIR) spectra indicate the presence of polar functional groups such as ether, amine, and urea in PPS leaky film, which confirm the crosslinking reaction. The functional groups endow the leaky film with Li-ion-affinity property.

SEM images display a rough surface morphology of the polymer composite film on the Cu foil containing submicron-sized pores which endow the film with "leaky" property. Elemental mapping analysis confirmed that Sift nanoparticles and PEI based polymer were uniformly distributed in the composite film. It was also observed that PEO in the PPS leaky film is amorphous ascribing to the in situ crosslinking between branched PEI and HDI to spatially restrain PEO crystallization. The amorphous PEO can facilitate improved Li-ion transport in the PPS layer. The PPS leaky film has good mechanical strength and flexibility owing to its inorganic/organic hybrid nature, which is beneficial to withstand the mechanical deformation upon the Li plating/stripping process.

Figure 6:
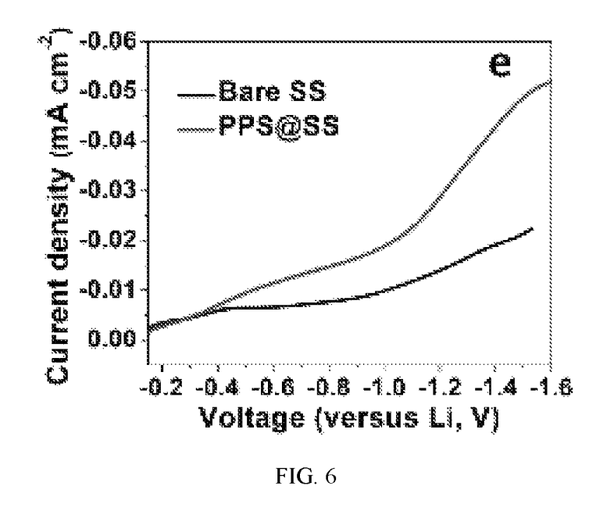
FIG. 6 shows linear sweep voltammetries of PPS@stainless steel (PPS@SS) and bare SS electrodes, in accordance with an embodiment of the present disclosure.

Owing to its chemical structure and Li-ion affinity, the PPS leaky film can not only self-concentrate the Li ion, but also induce the electrokinetic phenomena to enhance the Li-ion transport, which can be directly demonstrated by linear sweep voltammetry (LSV) shown in FIG. 6. As can be seen in FIG. 6, the higher current density of PPS leaky film electrode at voltages of −0.4-−1.1 V is attributed to the improved local Li-ion concentration in the leaky film, owing to its Li-ion affinity to adsorb Li ion. The Li-ion affinity also drives the formation of EDL on the leaky film surfaces, evidenced by the measured zeta potential of +36 mV in the electrolyte (1.0 M lithium hexafluorophosphate (LiPF$_6$) in ethylene carbonate (EC) and diethyl carbonate (DEC) (VN=1)). The existence of EDL induces electrokinetic surface conduction within the leaky film under an electric field. The electrokinetic surface conduction can enhance the Li-ion transport to overcome the diffusion-limited current under strong Li ion depletion conditions, which is manifested by the dramatic increase of current density of PPS leaky film electrode above −1.1 V in LSV. Additionally, the higher ion conductivity of solid-state Li-salt-adsorbed PPS leaky film (3.57×10$^{-5}$ S cm$^{-1}$ at 25° C.) than Li-salt-containing PPS dense film (1.96×10$^{-7}$ S cm$^{-1}$ at 25° C.) further demonstrates that the surface conduction promotes Li-ion conductivity even in a solid state.

The Li-ion transport enhancement PPS leaky film can effectively suppress the growth of dendritic Li at high deposition capacities and high current densities in a carbonate-based electrolyte. SEM images reveal that the deposited Li demonstrates a uniform, compact and dendrite-free morphology without penetrating the PPS layer under various deposition capacities and current densities (e.g., at 2 mAh $cm^{-2}$, 1 mA $cm^{-2}$; 4 mAh $cm^{-2}$, 2 mA $cm^{-2}$; 6 mAh $cm^{-2}$, 2 mA $cm^{-2}$). In contrast, the deposited Li on the bare Cu exhibits typical mossy and dendritic morphology at both low and high deposition capacities and current densities. After cycling (50 cycles), the PPS leaky film still enables dendrite-free deposition of Li. When Li was completely stripped from Cu foil, the PPS leaky film maintained its integrity without obvious changes in the structure during the Li plating/stripping process, demonstrating the PPS leaky film is very stable and robust.

Figure 7:
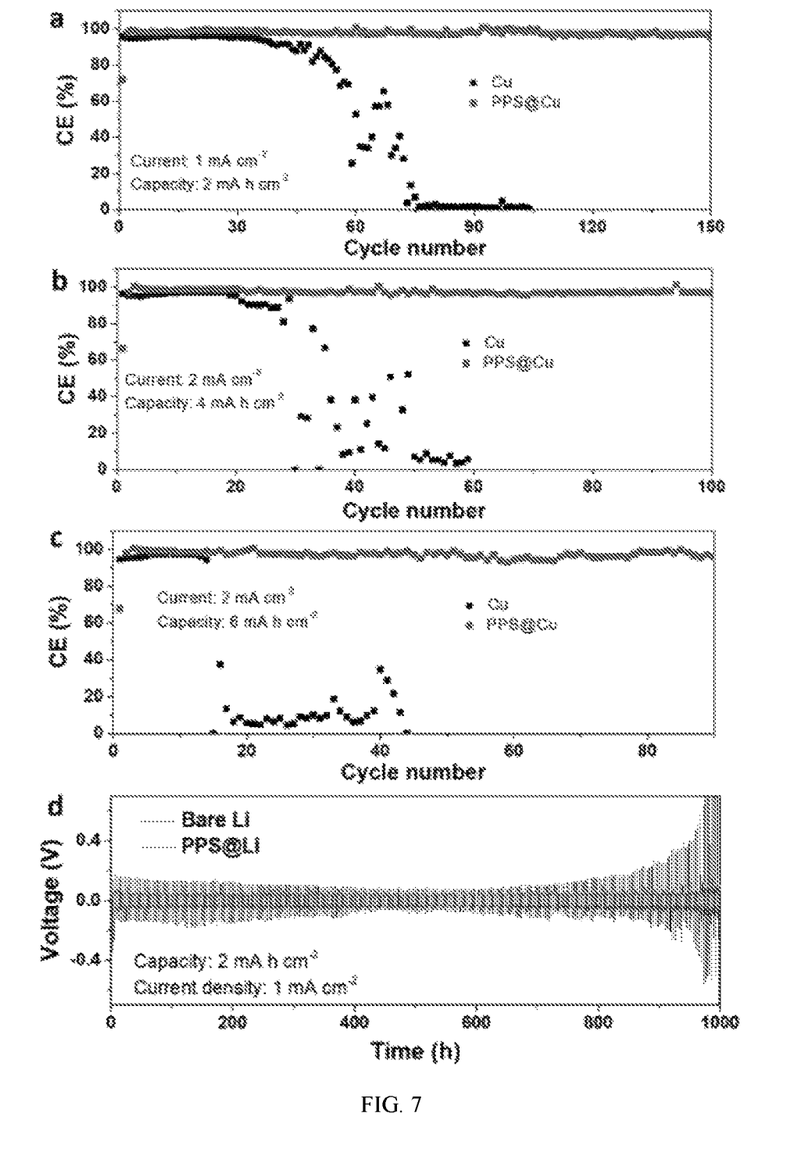
FIG. 7 shows electrochemical performance of PPS@Cu and bare Cu foil electrodes, in accordance with an embodiment of the present disclosure.

FIG. 7 shows electrochemical performance of PPS@Cu and bare Cu foil electrodes. CE of Li plating/stripping on PPS@Cu and bare Cu foil at a current density of 1 mA $cm^{-2}$ and a deposition capacity of 2 mAh $cm^{-2}$ (panel a), at a current density of 2 mA $cm^{-2}$ and a deposition capacity of 4 mAh $cm^{-2}$ (panel b), and at a current density of 2 mA $cm^{-2}$ and a deposition capacity of 6 mAh $cm^{-2}$ (panel c). FIG. 7 (panel d) shows cycling stability of symmetric cells using PPS leaky film protected Li metal as electrodes.

The uniform and dendrite-free deposition of Li enabled by PPS leaky film leads to an improvement of the Li plating/stripping CE. At a deposition capacity of 2 mAh $cm^{-2}$ and a current density of 1 mA $cm^{-2}$, the cells containing PPS leaky film deliver an enhanced average CE of 97.8% over 150 cycles FIG. 7, panel a). When the deposition capacities increased to 4 mAh $cm^{-2}$ (FIG. 7, panel b) and 6 mAh $cm^{-2}$ (FIG. 7, panel c) at a current density of 2 mA $cm^{-2}$, the cells containing PPS leaky film still maintained high average CEs of 97% over 100 cycles and 96.9% over 90 cycles, respectively. In contrast, the bare Cu electrodes show very poor CE and cycling stability.

The stable and low voltage hysteresis of the cells using PPS leaky film further indicates a good stability of the Li metal enabled by the PPS leaky film during cycling. FIG. 7, panel d shows the cycling stability of symmetric Li metal cells at a current density of 1 mA $cm^{-2}$ and a deposition capacity of 2 mAh $cm^{-2}$. Compared with the bare Li metal anodes exhibiting a gradual increase in hysteresis over cycles by almost 250% after 800 h, Li metal anodes with PPS leaky film show good cycling stability with a low overpotential at −40 mV for over 1000 h.

Battery with leaky film metal anode.

The stable Li metal anodes enabled by the PPS leaky film ensure their high performance in Li metal batteries. Full cells were assembled using thin PPS@Li foil (~120 μm) as anodes and high-areal-capacity NCM-811 (~4.2 mAh $cm^{-2}$) (PPS@Li|NCM-811) as cathodes.

Figure 8:
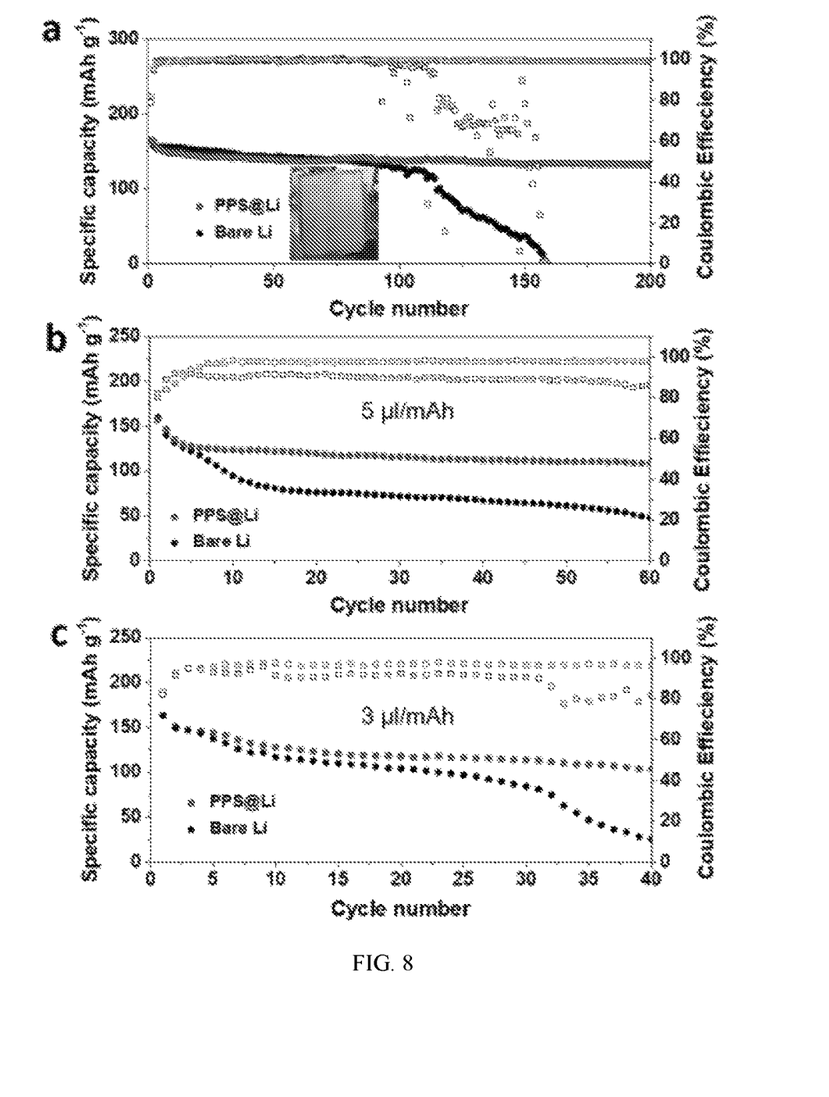
FIG. 8 shows cycling performance of full cells using PPS leaky film protected Li metal as anodes and NCM-811 as cathodes, in accordance with an embodiment of the present disclosure.

FIG. 8 shows cycling performance of full cells using PPS leaky film protected Li metal as anodes and NCM-811 as cathodes; panel a: Flooded electrolyte; panel b: Lean electrolyte of 5 μl/mA h; panel c: Lean electrolyte of 3 μl/mAh. The photo image of Li foil protected by PPS leaky film (20 cm×15 cm) is shown as an inset in (a), the thickness of Li foil is 120 μm. The areal capacity of NCM-811 cathode is around 4.2 mAh $cm^{-2}$.

When flooded electrolyte was used (FIG. 8, panel a), the cells with PPS@Li delivered a high initial discharge capacity of 165.4 mAh $g^{-1}$, and still maintained the capacity of 132.8 mAh $g^{-1}$ after 200 cycles (80.3% capacity retention) with an average CE of 99.4%, while the control cells show a fast capacity decay after 100 cycles. Under lean electrolyte conditions (5 μl/mAh in FIG. 8, panel b, 3 μl/mAh in FIG. 8, panel c), the cells with PPS@Li anodes still exhibit improved cycling stability, capacity retention and CE compared with control cells.

The porous material disclosed herein alters the metal deposition behavior owing to metal-ion electrokinetic self-concentrating/pumping effect and leads to the stable growth of dendrite-free metal at both high deposition capacity and current density, and in turn, extends the cycle lives of high-areal-capacity metal battery electrodes. This approach is generally applicable to various liquid electrolytes and can also resolve dendritic issues of Li anode at low temperatures. This strategy enables the uniform and dendrite-free deposition of, for example, Na and Zn metal at high deposition capacity and current density.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A battery comprising:
   an electrolyte;
   a metal anode comprising a porous material thereon wherein the porous material has a zeta potential with a magnitude of at least 15 mV in the electrolyte, the porous material comprising a cross-linked polymer having segments with polar functional groups, the polar functional groups comprising one or more of O, N, P, S, and B; and
   a cathode.

2. The battery of claim 1, wherein the metal anode comprises one of lithium, sodium, zinc, magnesium aluminum, or an alloy thereof.

3. The battery of claim 1, further comprising a separator selected among polyolefin microporous membrane, modified polypropylene fabric, polyethylene fabric, glass fiber fabric, superfine glass fiber paper, vinylon fabric, or composite membrane of nylon fabric, wettable polyolefin microporous membrane composited by welding or bonding, or a combination thereof.

4. The battery of claim 1, wherein the electrolyte comprises:
   (i) a solvent selected among carbonates, N-methyl acetamide, acetonitrile, symmetric sulfones, sulfolanes, polyethylene glycols, 1,3-dioxolanes, glymes, siloxanes, ethylene oxide grafted siloxanes, or a combination thereof, and
   (ii) a salt selected among lithium chloride (LiCl), lithium hexafluorophosphate ($LiPF_6$), Lithium bis(trifluoromethanesulfonyl)imide (LiTFSI), Lithium bis(fluorosulfonyl)imide (LiFSI), lithium tetrafluoroborate ($LiBF_4$), lithium methanesulfonate ($LiCH_3SO_3$), lithium trifluoromethanesulfonate ($LiCF_3SO_3$), lithium hexafluoroarsenate ($LiAsF_6$), lithium hexafluoroantimonate ($LiSbF_6$), lithium perchlorate ($LiClO_4$), $Li[BF_2(C_2O_4)]$, $Li[PF_2(C_2O_4)_2]$, $Li[N(CF_3SO_2)_2]$, $Li[C(CF_3SO_2)_3]$, lithium bisoxalatoborate (LiBOB), or a combination thereof.

5. The battery of claim 1, wherein the polar functional groups form at least 20% of the weight of the porous material.

6. The battery of claim 1, wherein the polymer comprises one among branched or unbranched polyamide, polyester, polyalkylene imine, polyalkylene oxide, or combinations thereof.

7. The battery of claim 1, wherein the porous material further comprises an inorganic compound.

8. The battery of claim 7, wherein the inorganic compound is one selected among $SiO_2$, $Al_2O_3$, MgO, CuO, CaO, ZnO, Si, SiO, $SrTiO_3$, $SnO_2$, $CeO_2$, NiO, $ZrO_2$, $Y_2O_3$, $TiO_2$, SiC, or a combination thereof.

9. The battery of claim 1, wherein the porous material has a porosity of at least 70%.

10. The battery of claim 1, wherein the porous material has a pore volume of at least 5 $cm^3$/g.

11. The battery of claim 1, wherein the porous material has an affinity for a metal ion and is configured to accommodate at least 70% of metal with respect to the weight of the porous material.

12. An electrode for a secondary battery comprising:
a porous material disposed on an electrode, wherein the porous material has a zeta potential with a magnitude of at least 15 mV in a non-aqueous electrolyte, the porous material comprising a cross-linked polymer having segments with polar functional groups, the polar functional groups comprising one or more of O, N, P, S, and B.

13. The electrode of claim 12, wherein the electrode comprises lithium, sodium, zinc, magnesium, aluminum, or an alloy thereof.

14. The electrode of claim 12, wherein the porous material comprises PEI based polyurea, poly(ethylene oxide) and silicon dioxide.

15. The electrode of claim 12, wherein the polar functional groups form at least 20% of the weight of the porous material.

16. The electrode of claim 12, wherein the polymer comprises one among branched or unbranched polyamide, polyester, polyalkylene imine, polyalkylene oxide, or combinations thereof.

17. The electrode of claim 12, wherein the porous material further comprises an inorganic compound.

18. The electrode of claim 17, wherein the inorganic compound is one selected among $SiO_2$, $Al_2O_3$, MgO, CuO, CaO, ZnO, Si, SiO, $SrTiO_3$, $SnO_2$, $CeO_2$, NiO, $ZrO_2$, $Y_2O_3$, $TiO_2$, SiC, or a combination thereof.

19. The electrode of claim 12, wherein the non-aqueous electrolyte comprises:
(i) a solvent selected among carbonates, N-methyl acetamide, acetonitrile, symmetric sulfones, sulfolanes, polyethylene glycols, 1,3-dioxolanes, glymes, siloxanes, ethylene oxide grafted siloxanes, or a combination thereof, and
(ii) a salt selected among lithium chloride (LiCl), lithium hexafluorophosphate ($LiPF_6$), Lithium bis(trifluoromethanesulfonyl)imide (LiTFSI), Lithium bis(fluorosulfonyl)imide (LiFSI), lithium tetrafluoroborate ($LiBF_4$), lithium methanesulfonate ($LiCH_3SO_3$), lithium trifluoromethanesulfonate ($LiCF_3SO_3$), lithium hexafluoroarsenate ($LiAsF_6$), lithium hexafluoroantimonate ($LiSbF_6$), lithium perchlorate ($LiClO_4$), Li[$BF_2$($C_2O_4$)], Li[$PF_2(C_2O_4)_2$], Li[$N(CF_3SO_2)_2$], Li[$C(CF_3SO_2)_3$], lithium bisoxalatoborate (LiBOB), or a combination thereof.

20. The electrode for a secondary battery of claim 12, wherein the porous material has an affinity for a metal ion and is configured to accommodate at least 70% of metal with respect to the weight of the porous material.

* * * * *